United States Patent
Delaney et al.

(10) Patent No.: US 9,604,445 B2
(45) Date of Patent: Mar. 28, 2017

(54) SYSTEM AND METHOD FOR EXTRACTING TRIGGERED DATA FROM A VARIABLE DATA STRING AND EMBEDDING THE TRIGGERED DATA INTO A SECURE BARCODE

(71) Applicant: CTPG Operating, LLC, Ithaca, NY (US)

(72) Inventors: Robert Delaney, Ithaca, NY (US); Kyle Turner, Binghamton, NY (US)

(73) Assignee: CTPG OPERATING, LLC, Ithaca, NY (US)

( * ) Notice: Subject to any disclaimer, the term of this patent is extended or adjusted under 35 U.S.C. 154(b) by 0 days.

(21) Appl. No.: 14/635,422

(22) Filed: Mar. 2, 2015

(65) Prior Publication Data

US 2015/0248267 A1   Sep. 3, 2015

Related U.S. Application Data

(60) Provisional application No. 61/947,111, filed on Mar. 3, 2014, provisional application No. 61/947,121, filed on Mar. 3, 2014, provisional application No. 61/947,135, filed on Mar. 3, 2014, provisional application No. 61/947,143, filed on Mar. 3, 2014, (Continued)

(51) Int. Cl.
   *H04N 1/40* (2006.01)
   *B41F 19/02* (2006.01)
   (Continued)

(52) U.S. Cl.
   CPC .............. *B41F 19/02* (2013.01); *B41J 2/325* (2013.01); *B41J 3/38* (2013.01); *G06F 3/1222* (2013.01);
   (Continued)

(58) Field of Classification Search
   CPC ........ B41J 3/38; G06F 3/1222; G06F 3/1236; G06F 3/1238; G06F 3/1259; G06F 3/1273;
   (Continued)

(56) References Cited

U.S. PATENT DOCUMENTS 4,638,340 A   1/1987 Iiyama
4,827,425 A   5/1989 Linden
(Continued)

FOREIGN PATENT DOCUMENTS

CN   101105837   1/2008
CN   102509032   6/2012
(Continued)

OTHER PUBLICATIONS

PCT International Search Report dated Jun. 1, 2015.
(Continued)

*Primary Examiner* — Jerome Grant, II
(74) *Attorney, Agent, or Firm* — George R. McGuire; Frederick J M Price; Bond, Schoeneck & King, PLLC

(57) ABSTRACT

A system and method for securing a data stream containing data to be embedded in a bar code. The system comprising a printer, having a nontransitory storage medium, configured to: receive a data stream from a host computer, the data stream having at least one trigger identifying at least one portion of data to be embedded in a bar code; identify each trigger in the received data stream; extract each data portion identified by the trigger; and print a secured bar code embedded with the extracted data portions.

16 Claims, 2 Drawing Sheets

Related U.S. Application Data provisional application No. 61/947,152, filed on Mar. 3, 2014, provisional application No. 61/947,160, filed on Mar. 3, 2014, provisional application No. 61/947,174, filed on Mar. 3, 2014, provisional application No. 61/947,197, filed on Mar. 3, 2014, provisional application No. 61/947,206, filed on Mar. 3, 2014, provisional application No. 61/947,214, filed on Mar. 3, 2014.

(51) Int. Cl.
  *G06F 3/12* (2006.01)
  *G06F 21/44* (2013.01)
  *G06F 21/60* (2013.01)
  *G06K 15/00* (2006.01)
  *H04N 1/00* (2006.01)
  *G06K 15/02* (2006.01)
  *H04N 1/32* (2006.01)
  *B41J 2/325* (2006.01)
  *B41J 3/38* (2006.01)

(52) U.S. Cl.
  CPC .......... *G06F 3/1236* (2013.01); *G06F 3/1238* (2013.01); *G06F 3/1259* (2013.01); *G06F 3/1273* (2013.01); *G06F 3/1285* (2013.01); *G06F 3/1288* (2013.01); *G06F 3/1293* (2013.01); *G06F 3/1294* (2013.01); *G06F 21/44* (2013.01); *G06F 21/602* (2013.01); *G06F 21/608* (2013.01); *G06K 15/028* (2013.01); *G06K 15/4095* (2013.01); *H04N 1/00204* (2013.01); *H04N 1/3232* (2013.01); *H04N 2201/0082* (2013.01); *H04N 2201/3269* (2013.01)

(58) Field of Classification Search
  CPC .... G06F 3/1285; G06F 3/1288; G06F 3/1293; G06F 3/1294; G06F 12/44; G06F 21/602; G06F 21/608; G06F 21/44; H04N 1/204; H04N 1/3232; H04N 2201/82; H04N 2201/3269; H04N 15/28; H04N 15/4095
  USPC ... 358/1.15, 468, 3.23, 1.14, 1.16, 400, 1.18
  See application file for complete search history.

(56) References Cited

U.S. PATENT DOCUMENTS

| | | | |
|---|---|---|---|
| 5,512,977 A | 4/1996 | Imai | |
| 5,552,009 A | 9/1996 | Zager | |
| 5,619,026 A | 4/1997 | Chou | |
| 5,991,411 A | 11/1999 | Kaufman | |
| 6,148,331 A * | 11/2000 | Parry | G06F 17/30879 283/70 |
| 6,196,459 B1 | 3/2001 | Goman | |
| 6,202,155 B1 | 3/2001 | Tushie | |
| 6,203,069 B1 | 3/2001 | Outwater | |
| 6,335,799 B1 | 1/2002 | Provost | |
| 6,362,869 B1 | 3/2002 | Silverbrook | |
| 6,362,893 B1 | 3/2002 | Francis | |
| 6,367,011 B1 | 4/2002 | Lee | |
| 6,390,377 B1 | 5/2002 | Dlugos | |
| 6,394,358 B1 | 5/2002 | Thaxton | |
| 6,396,594 B1 | 5/2002 | French | |
| 6,540,142 B1 | 4/2003 | Alleshouse | |
| 6,597,385 B2 | 7/2003 | Verdyck | |
| 6,650,430 B2 | 11/2003 | Francis | |
| 6,738,903 B1 | 5/2004 | Haines | |
| 6,750,985 B2 | 6/2004 | Rhoads | |
| 6,985,600 B2 | 1/2006 | Rhoads | |
| 6,991,164 B2 | 1/2006 | Lemelson | |
| 7,025,269 B2 | 4/2006 | Marshall | |
| 7,099,026 B1 | 8/2006 | Hren | |
| 7,229,025 B2 | 6/2007 | Sussmeier | |
| 7,233,930 B1 | 6/2007 | Ryan, Jr. | |
| 7,284,279 B2 | 10/2007 | Morrison | |
| 7,286,150 B2 | 10/2007 | Hann | |
| 7,383,768 B2 | 6/2008 | Reichwein | |
| 7,460,252 B2 | 12/2008 | Campbell | |
| 7,535,586 B2 | 5/2009 | Kumashio | |
| 7,546,952 B2 | 6/2009 | Knowles | |
| 7,556,444 B2 | 7/2009 | Kurashina | |
| 7,588,188 B2 | 9/2009 | Knowles | |
| 7,614,560 B2 | 11/2009 | Knowles | |
| 7,691,280 B2 | 4/2010 | Waldrop | |
| 7,852,359 B2 | 12/2010 | Evans | |
| 7,958,359 B2 | 6/2011 | Sharma | |
| 8,033,477 B2 | 10/2011 | Jones | |
| 8,045,191 B2 | 10/2011 | Yamanaka | |
| 8,085,438 B2 | 12/2011 | Hersch | |
| 8,100,330 B2 | 1/2012 | Bulan | |
| 8,203,583 B2 | 6/2012 | Wilsher | |
| 8,240,797 B2 | 8/2012 | Haas | |
| 8,339,632 B2 | 12/2012 | Wasamoto | |
| 8,345,316 B2 | 1/2013 | Bradley | |
| 8,355,180 B2 | 1/2013 | Wu | |
| 8,395,646 B2 | 3/2013 | Yamamoto | |
| 8,402,371 B2 | 3/2013 | Tang | |
| 8,424,751 B2 | 4/2013 | Liu | |
| 8,481,108 B2 | 7/2013 | Roth | |
| 8,496,186 B2 | 7/2013 | Ito | |
| 8,551,387 B2 | 10/2013 | Feldman | |
| 8,593,696 B2 | 11/2013 | Picard | |
| 8,687,241 B2 | 4/2014 | Simske | |
| 8,736,897 B2 | 5/2014 | Pierce | |
| 8,826,004 B2 | 9/2014 | Euchner | |
| 2002/0042884 A1 | 4/2002 | Wu | |
| 2002/0051167 A1 | 5/2002 | Francis | |
| 2003/0145218 A1 | 7/2003 | Hutchison | |
| 2003/0169435 A1* | 9/2003 | Kobayashi | G06K 15/00 358/1.2 |
| 2004/0050936 A1 | 3/2004 | Look | |
| 2004/0179078 A1 | 9/2004 | Gundjian | |
| 2006/0044589 A1 | 3/2006 | Nakagawaji | |
| 2006/0088160 A1 | 4/2006 | Brown | |
| 2006/0212715 A1 | 9/2006 | Terao | |
| 2007/0091377 A1 | 4/2007 | Smith | |
| 2007/0103536 A1 | 5/2007 | Fujimaki | |
| 2009/0086967 A1 | 4/2009 | Ozawa | |
| 2010/0012736 A1 | 1/2010 | Wilds | |
| 2010/0071077 A1 | 3/2010 | Morris | |
| 2010/0108874 A1 | 5/2010 | Zahedi | |
| 2011/0016388 A1 | 1/2011 | Tang | |
| 2011/0045256 A1 | 2/2011 | Luther | |
| 2011/0123132 A1 | 5/2011 | Schneck | |
| 2012/0176651 A1 | 7/2012 | Pham | |
| 2013/0015236 A1 | 1/2013 | Porter | |
| 2013/0141755 A1 | 6/2013 | Miller | |
| 2013/0215474 A1 | 8/2013 | Caton | |
| 2013/0320099 A1 | 12/2013 | Acton | |
| 2014/0185800 A1 | 7/2014 | Fallon | |
| 2014/0233053 A1 | 8/2014 | Kakutani | |
| 2014/0283118 A1* | 9/2014 | Anderson | G06F 21/51 726/27 |

FOREIGN PATENT DOCUMENTS

| | | | |
|---|---|---|---|
| CN | 102658739 | 9/2012 | |
| EP | 0331048 | * 6/1989 | G03B 17/24 |
| JP | 2003334997 | 11/2003 | |
| JP | 2005202553 | 7/2005 | |
| JP | 2007058535 | 3/2007 | |
| KR | 20040099065 | 11/2004 | |
| KR | 20040100540 | 12/2004 | |
| WO | 2005051676 | 6/2005 | |
| WO | 2009106107 | 9/2009 | |

OTHER PUBLICATIONS

Wilson, S., The "Security Printer" Model for CA Operations, Lockstep White Paper No. 3, Sep. 2005, pp. 1-7, Lockstep Consulting Pty Ltd.

(56) References Cited

OTHER PUBLICATIONS

Simske, S., Aronoff, J., Sturgill, M., Security Printing Deterrents: A Comparison of Thermal Ink Jet, Dry Electrophotographic, and Liquid Electrophotographic Printing, Journal of Imaging Science and Technology, 2008, vol. 52(5), Dec. 2008.
Jordan, F., Yribar, J., Turning Your Smartphone Into an Authentication Device, International Pharmaceutical Industry, 2013, pp. 104-112, vol. 5, Issue 3, Dec. 2013.
Lexmark Cutting-Edge Security for Printers and MFPs brochure, Lexmark, 2011, Dec. 2011.
Digital Printing Security Solutions, Best Practices, Kodak, 2011, Dec. 2011.
Extend Labeling Control Beyond the Enterprise, http://www.nicelabel.com/products/powerforms-web, Jun. 15, 2014.
Security Features of Lexmark Laser Printers: Overview, Technical White Paper, Lexmark, copyright 2005, Dec. 2005.

\* cited by examiner

SYSTEM AND METHOD FOR EXTRACTING TRIGGERED DATA FROM A VARIABLE DATA STRING AND EMBEDDING THE TRIGGERED DATA INTO A SECURE BARCODE

RELATED APPLICATION DATA

The present application claims priority to and the benefit of U.S. provisional patent application No. 61/947,111, filed on Mar. 3, 2014; U.S. provisional patent application No. 61/947,121, filed on Mar. 3, 2014; U.S. provisional patent application No. 61/947,135, filed on Mar. 3, 2014; U.S. provisional patent application No. 61/947,143, filed on Mar. 3, 2014; U.S. provisional patent application No. 61/947,152, filed on Mar. 3, 2014; U.S. provisional patent application No. 61/947,160, filed on Mar. 3, 2014; U.S. provisional patent application No. 61/947,174, filed on Mar. 3, 2014; U.S. provisional patent application No. 61/947,197, filed on Mar. 3, 2014; U.S. provisional patent application No. 61/947,206, filed on Mar. 3, 2014; and U.S. provisional patent application No. 61/947,214, filed on Mar. 3, 2014, the entire contents of which are hereby incorporated by reference.

FIELD OF THE INVENTION

The present invention relates to printers capable of printing security features on a media substrate and, more particularly, to a system and method for extracting triggered data from a variable data string and embedding the triggered data in secure barcode.

BACKGROUND

Security documents are used across a diverse marketplace to deter fraud, counterfeiting and theft. In most cases, the security documents are pre-printed on media. The pre-printed media must be stored in a secure location so that counterfeiters and thieves are not able to obtain the secure media which would allow them to freely print fraudulent documents.

There are printers that can print these secure patterns on demand on standard media. In brief, security printing relates to the practice of manufacturing media substrate with certain security indicia/features to prevent forgery and counterfeiting of items such as passports, checks, and prescription pads. As should be understood by those of ordinary skill in the art, security printing can include, for example, the inclusion of watermarks, UV coatings, security fibers, microprinting, holograms, phosphorescent inks, and pantographs (e.g., "void") etc. in the manufacture of the media substrate. The advantage of these "security printers" is that standard media does not have to be secured from theft as the secure documents can be created on demand.

One such security feature is a secured barcode. Some secured barcodes operate by embedding an extra layer of data within the barcode. The extra layer cannot be read by an ordinary bar code scanner. The embedded secure data on the barcode can be used to validate a secure document when it is presented for authentication, by using a particular reader programmed to read the secured barcode with the embedded secure data.

However, security printers are potential targets for counterfeiters. In particular, a counterfeiter wanting to learn the identity and other particulars of the embedded secured barcode could attempt to read the data transmitted to the printer to be encoded into the secured barcode. A counterfeiter possessing this data could potentially duplicate the complete secured barcode with embedded data and make unauthorized copies of counterfeit secured document, and would not require the specialized reader to spoof the document. Accordingly, a need exists in the art for a system and method for obscuring the data to be embedded within a barcode such that a hacker could not identify the data within a data stream sent to a printer.

SUMMARY OF THE INVENTION

The present invention recognizes that security printers capable of printer secured barcodes are targets for counterfeiters and need to be secured against someone intercepting a data stream containing data to be embedded in a secured barcode. Accordingly, various embodiments are directed to a system and method for extracting triggered data from a data stream, the trigger data obscuring the triggered data to be embedded in the secured barcode so the triggered data cannot be easily identified. Wherein the triggers embedded in the data stream identify the data to be embedded in the barcode. The triggers are intended to be unknown to a counterfeiter intercepting the data stream, and the triggers may be regularly changed and included in the data stream in various combinations and permutations so that the triggers (and thus, the triggered data) remain secret.

According to an embodiment, the system for securing a data stream containing data to be embedded in a bar code further comprises a printer, having a nontransitory storage medium, configured to: receive a data stream from a host computer, the data stream having at least one trigger identifying at least one portion of data to be embedded in a bar code; identify each trigger in the received data stream; extract each data portion identified by the trigger; and print a secured bar code embedded with the extracted data portions.

According to an embodiment, the system further comprises: a host computer, having a nontransitory storage medium, configured to: receive data identifying the trigger; and encoding the data stream having the at least one trigger.

According to an embodiment, identifying comprises: receiving data identifying the trigger; parsing the received data stream; and comparing the received data stream to the data identifying the trigger to locate any triggers within the data stream.

According to an embodiment, the data identifying the trigger is received from a second computer.

According to an embodiment, the data received from the second computer is received via a server.

According to an embodiment, extracting the data portion comprises identifying a pattern around the trigger, wherein the trigger is a reference for orienting the pattern.

According to an embodiment, the trigger comprises a code for locating the portion of data in the data stream.

According to an embodiment, extracting comprises interpreting the code of the trigger.

According to an embodiment, the at least one trigger comprises a first trigger identifying a first portion of data in the data stream, and the second trigger identifying a second, non-adjacent portion of data in the data stream.

According to another aspect, a method for securing a data stream containing data to be embedded in a bar code, comprising the steps of: receiving a data stream from a host computer, the data stream having at least one trigger identifying at least one portion of data to be embedded in a bar code; identifying each trigger in the received data stream;

extracting each data portion identified by the trigger; and printing a secured bar code embedded with the extracted data portions.

According to an embodiment, the method further comprises the steps of: receiving data identifying the trigger; encoding the data stream having the at least one trigger.

According to an embodiment, the step of identifying comprises: receiving data identifying the trigger; parsing the received data stream; and comparing the received data stream to the data identifying the trigger to locate any triggers within the data stream.

According to an embodiment, the data identifying the trigger is received from a second computer.

According to an embodiment, the data received from the second computer is received via a server.

According to an embodiment, the step of extracting the data portion comprises identifying a pattern around the trigger, wherein the trigger is a reference for orienting the pattern.

According to an embodiment, the trigger comprises code for locating the portion of data in the data stream.

According to an embodiment, the step of extracting comprises interpreting the code of the trigger.

According to an embodiment, at least one trigger comprises a first trigger identifying a first portion of data in the data stream, and the second trigger identifying a second, non-adjacent portion of data in the data stream.

In accordance with a preferred embodiment of the present invention, a specialized improved computer system is created—here the devices and/or systems that are specifically structured, configured, connected, and/or programmed to extract triggered data from a data stream sent from a host computer to a printer, containing data to embed into a secured barcode. This data stream encoded with triggers obscures the data to be embedded in the barcode, making it harder for counterfeiters to intercept the data and spoof the barcode.

The data transmission, communication, and any control signals between the at least one host computer and the printer are sent and received pursuant to wired or wireless communication. The wireless communication/transmission can be over a network, which can be any suitable wired or wireless network capable of transmitting communication, including but not limited to a telephone network, Internet, Intranet, local area network, Ethernet, online communication, offline communications, wireless communications and/or similar communications means. The wireless transmission can be accomplished through any wireless protocol/technology, including, but not limited to, ZigBee standards-based protocol, Bluetooth technology, and/or Wi-Fi technology. Further, this data can be encrypted as needed based on the sensitivity of the data or the location the printer, for example. The devices can be located in the same room, in a different room in the same building, and/or in a completely different building and location from each other. A user using a host computer (or a different computer) can send data transmission, control or communication signals to the printer perform any of the functionalities described herein.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
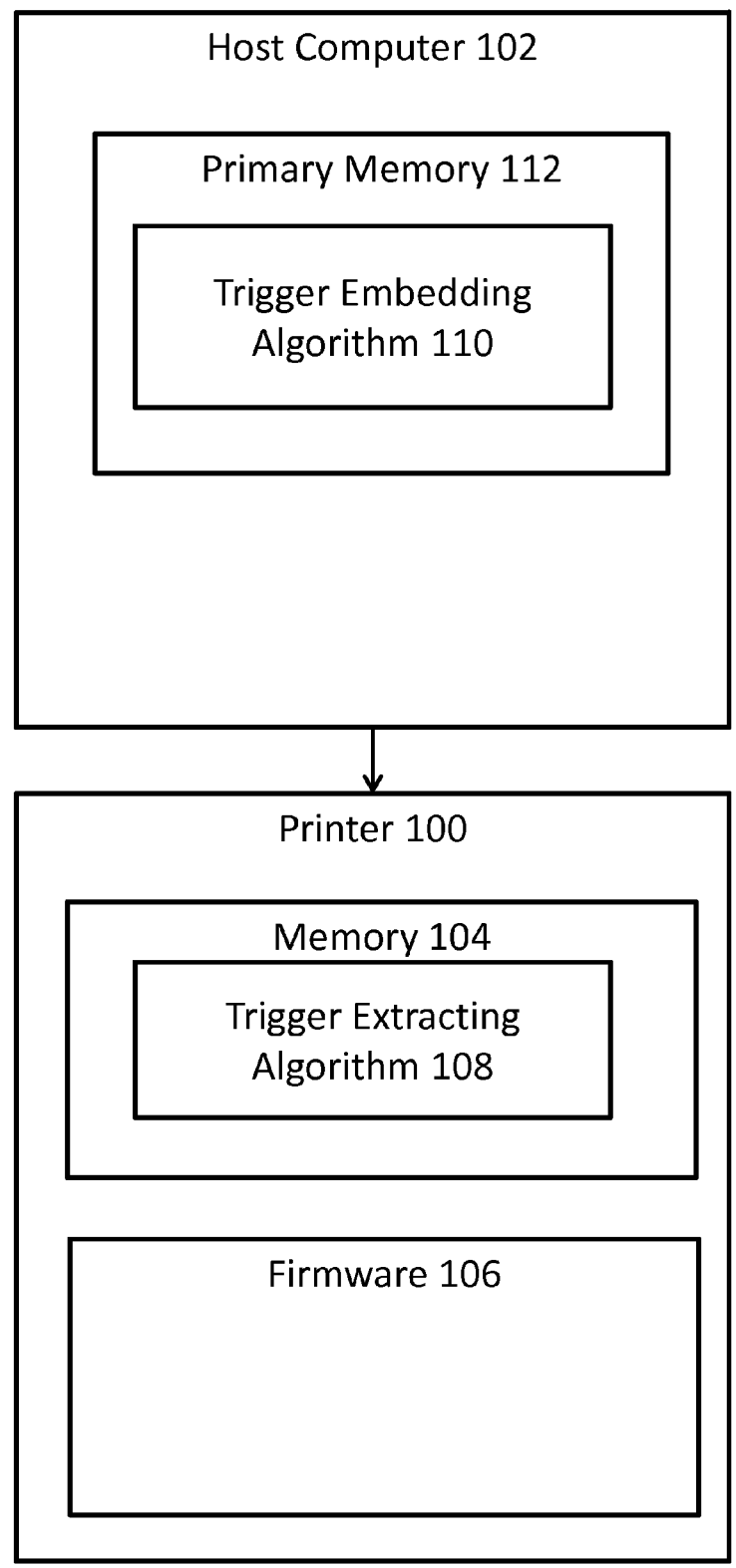
FIG. 1 is a system architecture diagram of a printer that is in communication with a host computer, according to an embodiment of the present invention.

The present invention will be more fully understood and appreciated by reading the following Detailed Description in conjunction with the accompanying drawings, wherein like reference numerals refer to like components.

Embodiments of a thermal printer, examples of which can be used as the printer in conjunction with embodiments of the methods and systems described herein and shown in the referenced Figures, exist and are possible. Applicant hereby incorporates by reference the embodiments of thermal printer 104 disclosed in paragraphs [0010]-[0014] and [0028]-[0031] and FIGS. 1-4 of U.S. Pat. Application Publication Number 2015/0009271, entitled "System and Method of Thermal Printing Security Features." The thermal printer can be connected, configured, programmed and/or structured to perform the functions described herein.

Embodiments of a thermal transfer printer, examples of which can be used as the printer in conjunction with embodiments of the methods and systems described herein and shown in the referenced Figures, exist and are possible. The thermal transfer printer can be connected, configured, programmed and/or structured to perform the functions described herein.

Even though thermal printers and thermal transfer printers are specifically referenced and described in certain embodiments herein, other digital printers and corresponding appropriate media substrates (e.g., thermal and standard media) are contemplated to be part of the systems and methods described herein.

Turning to FIG. 1, a system architecture diagram of a thermal printer 100 that is structured, configured, and/or programmed to print security features such as pantographs, watermarks, secured barcodes, and microprinting on a thermal media substrate (not shown), and can have various communication links to a computer 102, according to an embodiment of the present invention is shown. A user using the computer 102 (or a different computer 102) can instruct the thermal printer 100 to print a particular pre-stored security feature (e.g., a particular pantograph loaded in memory of the thermal printer 100) on a thermal media substrate, and to merge the particular security feature with variable data.

The thermal printer 100 can include a memory 104 that can store at least one security feature and preferably, a plurality of security features, and firmware 106 that can be programmed to print the at least one security feature, and preferably, the plurality of security features on demand that are stored in the memory, and to merge the security feature(s) with variable data (such as receipt, check, or prescription data, for example, as should be understood by those of skill in the art) preferably in real time depending on the particular application. The firmware 106 and memory 104 can have wired/wireless communication connections to the computer 102. In an alternative embodiment, the security feature (such as a pantograph) can be stored, updated, etc. on the computer 102.

Figure 2:
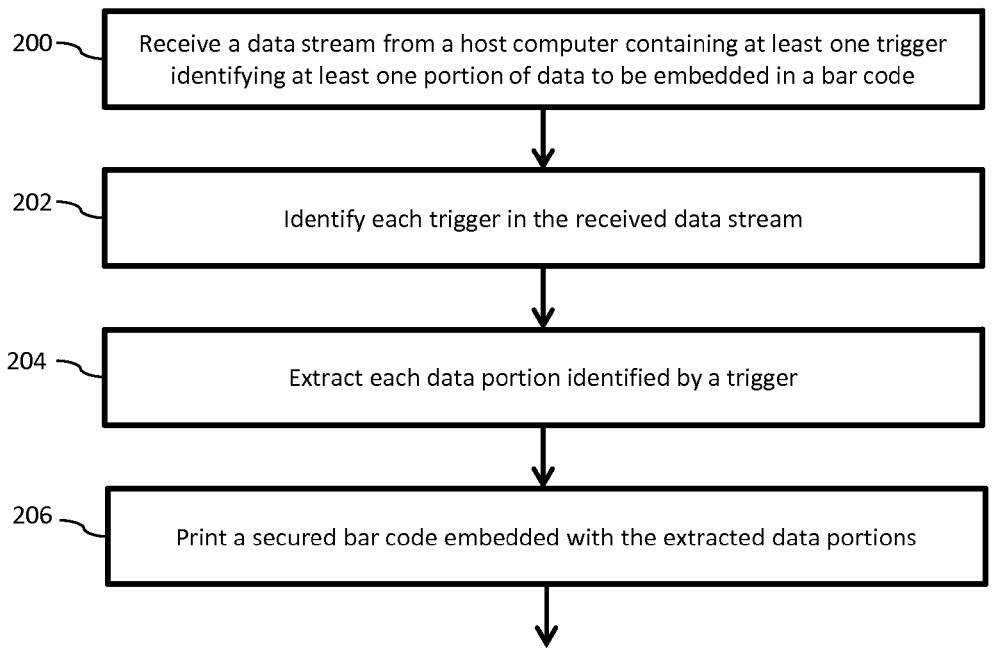
FIG. 2 is a flowchart of a method according to an embodiment of the present invention.

In exemplary embodiment, thermal printer 100 may store a trigger extracting algorithm 108 in a nontransitory storage medium, such as in firmware, or primary or secondary memory. When implemented, the trigger extracting algorithm may perform the steps shown in FIG. 2, according to an embodiment. Turning now to FIG. 2, in step 200 printer 100 receives a data stream from host computer 102 containing at least one trigger identifying at least one portion of data to be embedded in a secure barcode.

In step 202, printer 100 identifies each trigger in the received data stream. Prior to receiving the data stream, printer 100 may have received data identifying each trigger from host computer 102 or from another source, such as a through the cloud (i.e., an internet service or other application operating on a remote server or device), through an application running on a mobile device, other any other method for inputting data to a printer (including at manufacture), as will be appreciated by a person of ordinary skill in the art in conjunction with a review of this disclosure. It will also be appreciated that the data identifying the triggers need not be received prior to receiving the data stream. For example, printer 100 may receive from host computer 100 a data stream, store the received data stream and wait until printer 100 receives any necessary data identifying the triggers. Regardless of when the data identifying the triggers is received, it may be stored on printer 100 and retrieved upon receiving a data stream. Once the data stream is received, and data identifying the triggers is retrieved, the data stream can be parsed and compared to the data identifying the triggers, identifying any triggers present in the data stream. As a corollary to step 202, host computer 102 can receive any data identifying the triggers so that it may place them in the data stream appropriately.

As will be appreciated, the triggers may take on any number of forms, and function in a variety of ways. For example, the triggers may be a simple text string, forming a known word, such as "date" or "receipt." Any data following the known word may be the data to be embedded. Similarly, printer 100 may be programmed to take a known set of bits, following the trigger, as the data to extract (or characters, numbers, etc.). For example, printer 100 may be programmed to extract the first 8000 bits of data following a known trigger word. Printer 100 may be further programmed to extract a number of bits occupying predetermined locations around the trigger. For example, printer 100 may be programmed to extract the data immediately preceding the trigger or ten bits after the trigger, or any pattern of bits surrounding the trigger, with the trigger serving as a reference point with which to orient the pattern.

Alternately, the trigger may itself be code identifying a portion or set of portions of the data stream to extract. For example, a trigger may read, "tr-80-60," first identifying the trigger as "tr," followed by a code which could be interpreted to identify the data to extract as the "60" characters appearing "80" characters into the bit stream. It will be appreciated that the trigger may take on any number of forms to identify any number of characters (bits, numbers, etc.) within a data stream. Furthermore, multiple triggers may be used, each identifying separate, non-adjacent portions of a data stream to extract. The triggers may also provide instructions on how to assemble the extracted data in the proper order. This may be particularly advantageous where the triggers identify multiple non-adjacent portions of data, as the non-adjacent portions may not be coded in order and may need to be reordered.

In addition, printer 100 may be programmed to identify different kinds of triggers. For example, printer 100 could be programmed to identify a trigger that serves as a simple marker of the data to be extracted, and identify another, more complex trigger, identifying the specific data to extract and how to assemble the data. Furthermore, printer 100 may be configured to identify multiple kinds of triggers within the same data stream. Using multiple kinds of triggers may be useful to prevent someone from identifying the triggers being used in any particular data stream.

A trigger may also identify a portion of code to be received in a later-sent data stream. For example, a trigger may identify the third consecutive data stream sent from computer 100 as a data stream containing the data to extract. Alternately, a trigger may identify a set of data to extract from any data stream received during a certain interval of time. For example, a trigger may identify a portion of data to extract from any data stream received more than 15 seconds but less than 30 seconds after receiving the data stream containing the trigger. In this way, the triggers may serve as a way to program printer 100 to identify certain portions of data received at later times.

As will be appreciated, the triggers may be changed or otherwise altered in real time. Alternately different triggers may be programmed to be adopted at different times or at predetermined intervals. For example host computer, and printer could be programmed to adopt (transmit, receive and/or utilize, respectively) one set of triggers during a first time interval, and a second set of triggers during a different interval.

Once the triggers have been identified, the portion of data identified by the triggers is extracted in step 204. This step may include executing the steps preprogrammed into printer 100, or coded by the triggers or by the triggered data, or a combination of preprogrammed steps and steps coded by the triggers or triggered data, according to the various embodiments. The data may be formed from a known data type, such as characters and strings defined by a character set such as ASCII, or may be formed from a proprietary data designed specifically for encoding secured bar codes. As will be appreciated, the data may take any form sufficient for encoding a secured bar code. The extracted data may be temporarily stored in an array in primary memory, or may be stored in secondary memory to be retrieved at a later time.

In step 206, printer 100 prints a secure bar code embedded with the extracted data portions, as should be appreciated by a person of ordinary skill in conjunction with a review of this disclosure.

A reader application may be set up on a remote mobile device such as a phone or scanner connected to a cloud application, or network of host computers. The reader may be used to validate a secure barcode when it is presented for authentication. The reader can send the secure data read from the secure layer of the barcode to the cloud app or host computer network for authentication.

A "module," as may be used herein, can include, among other things, the identification of specific functionality represented by specific computer 102 software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, completely or partly on the thermal printer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While several embodiments of the invention have been discussed, it will be appreciated by those skilled in the art that various modifications and variations of the present invention are possible. Such modifications do not depart from the spirit and scope of the present invention.

What is claimed is:

1. A system for securing a data stream containing data to be embedded in a bar code, comprising:
    a printer, having a nontransitory storage medium, configured to:
        receive a data stream from a host computer, the data stream having at least one trigger being formed of a first portion of the received data and identifying at least one portion of data to be embedded in a bar code, wherein the first portion and the at least one identified portion are different portions of the received data;
        identify each trigger in the received data stream;
        extract each data portion identified by the trigger; and
        convert the extracted data to barcode data embedded with the extracted data, wherein the barcode data and the extracted data are of different data types;
        print a secured bar code embedded with the extracted data portions.

2. The system of claim 1, wherein the configuration to identify further comprises a configuration to:
    receive data identifying the trigger;
    parse the received data stream; and
    compare the received data stream to the data identifying the trigger to locate any triggers within the data stream.

3. The system of claim 2, wherein the data identifying the trigger is received from a second computer.

4. The system of claim 3, wherein the data received from the second computer is received via a server.

5. The system of claim 1, wherein extracting the data portion comprises identifying a pattern around the trigger, wherein the trigger is a reference for orienting the pattern.

6. The system of claim 1, wherein the trigger comprises a code for locating the portion of data in the data stream.

7. The system of claim 6, wherein the configuration to extract further comprises a configuration to interpret the code of the trigger and locate the data in the data stream.

8. The system of claim 1, wherein the at least one trigger comprises a first trigger identifying a first portion of data in the data stream, and a second trigger identifying a second, non-adjacent portion of data in the data stream.

9. A method for securing a data stream containing data to be embedded in a bar code, comprising the steps of:
    receiving a data stream from a host computer, the data stream having at least one trigger being formed of a first portion of the received data and identifying at least one portion of data to be embedded in a bar code, wherein the first portion and the at least one identified portion are different portions of the received data;
    identifying each trigger in the received data stream;
    extracting each data portion identified by the trigger; and
    converting the extracted data to barcode data embedded with the extracted data, wherein the barcode data and the extracted data are of different data types;
    printing a secured bar code embedded with the extracted data portions.

10. The method of claim 9, wherein the step of identifying comprises:
    receiving data identifying the trigger;
    parsing the received data stream; and
    comparing the received data stream to the data identifying the trigger to locate any triggers within the data stream.

11. The method of claim 10, wherein the data identifying the trigger is received from a second computer.

12. The method of claim 11, wherein the data received from the second computer is received via a server.

13. The method of claim 9, wherein the step of extracting the data portion further comprises identifying a pattern around the trigger, wherein the trigger is a reference for orienting the pattern.

14. The method of claim 9, wherein the trigger is a code for locating the portion of data in the data stream.

15. The method of claim 14, wherein the step of extracting further comprises interpreting the code of the trigger.

16. The method of claim 9, wherein the at least one trigger comprises a first trigger identifying a first portion of data in the data stream, and a second trigger identifying a second, non-adjacent portion of data in the data stream.

* * * * *